Dec. 4, 1951 — T. B. OWENS — 2,577,663
INDICATOR
Filed Dec. 24, 1948 — 4 Sheets-Sheet 1

Inventor
Thomas B. Owens

Dec. 4, 1951     T. B. OWENS     2,577,663
INDICATOR

Filed Dec. 24, 1948     4 Sheets-Sheet 2

Inventor
Thomas B. Owens
By Ted Tim of Charles H. Will Attys

Dec. 4, 1951   B. OWENS   2,577,663
INDICATOR
Filed Dec. 24, 1948   4 Sheets-Sheet 3
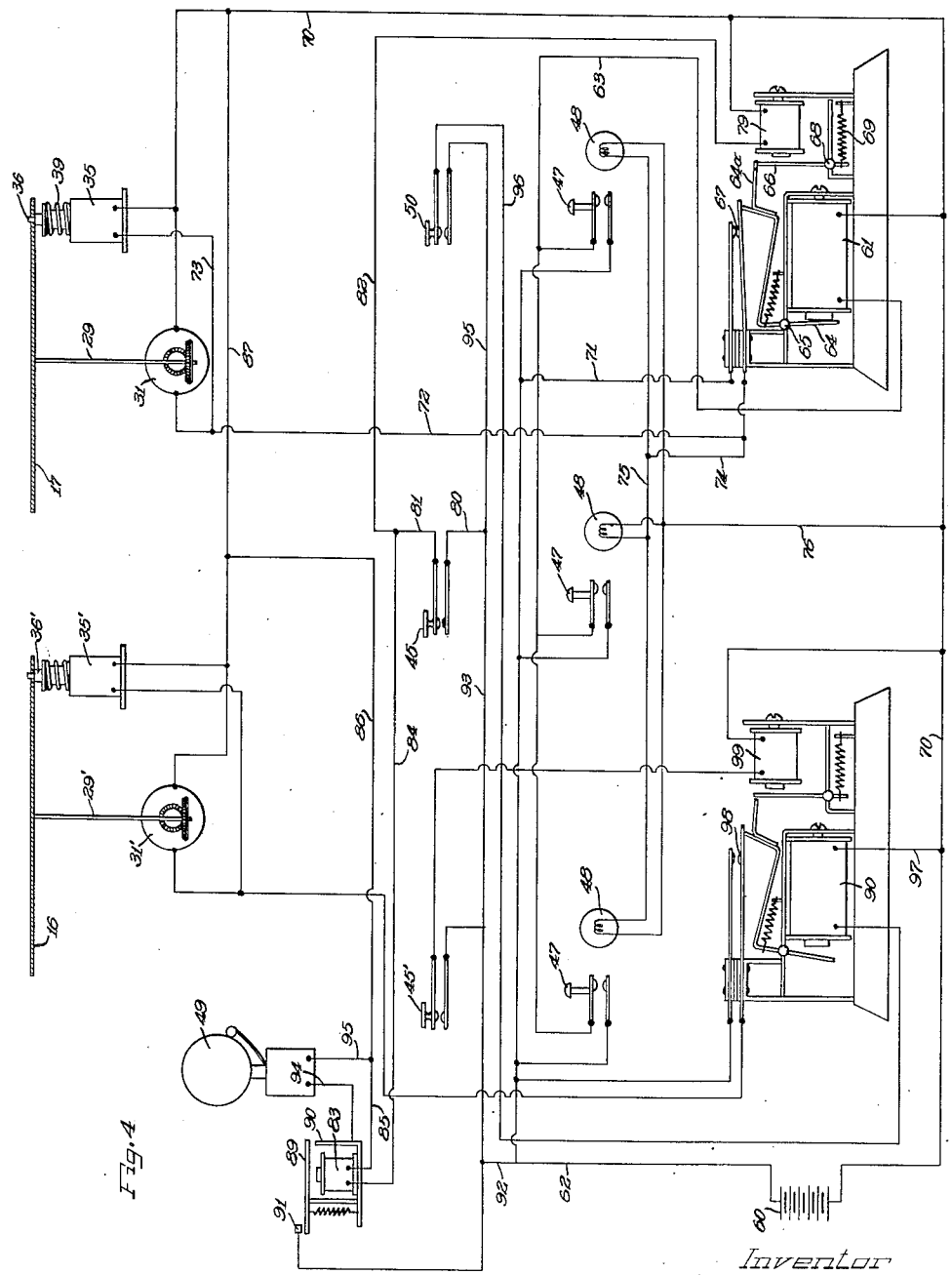
Inventor
Thomas B. Owens
By [signature] Attys

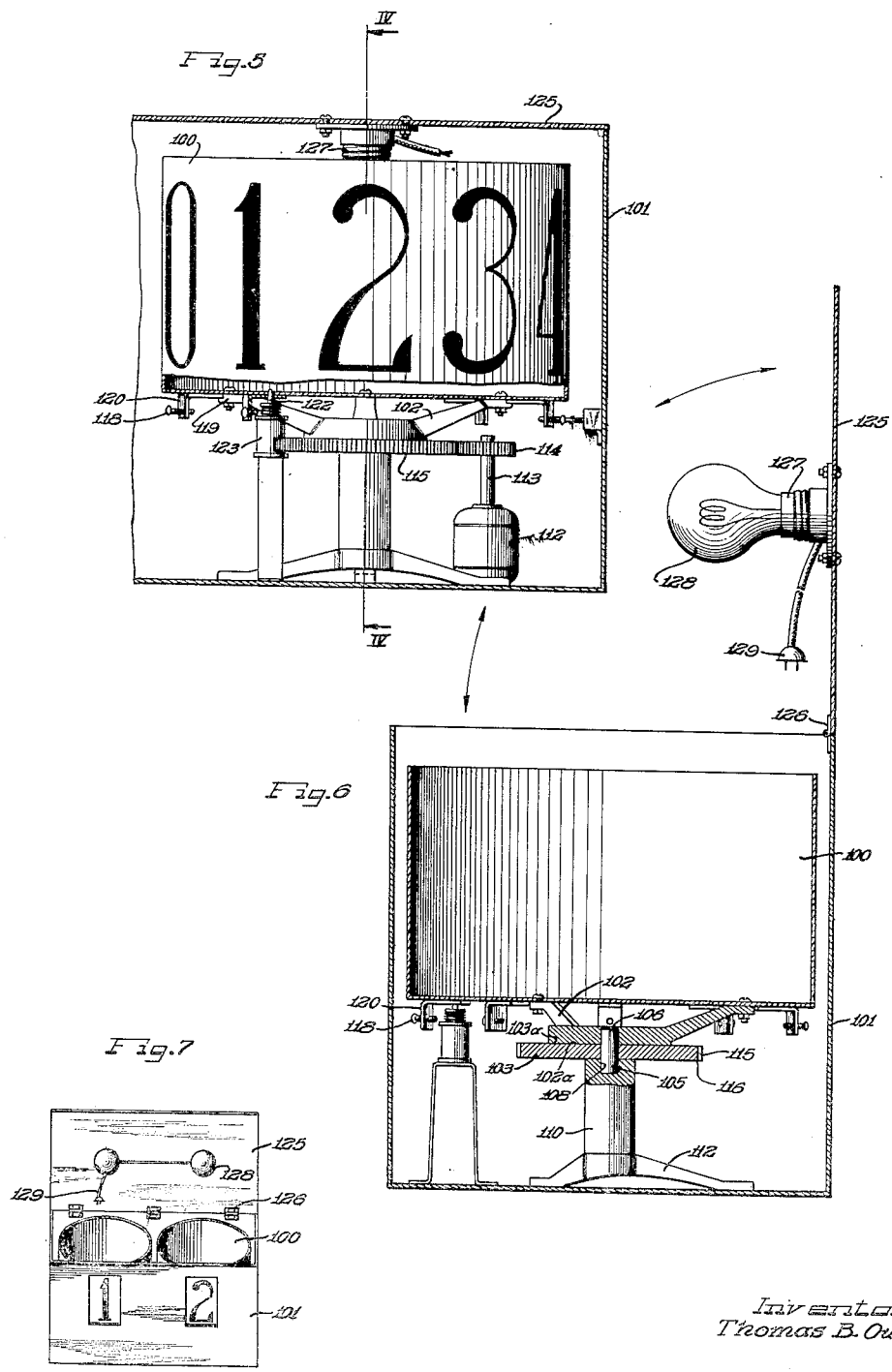

Patented Dec. 4, 1951

2,577,663

UNITED STATES PATENT OFFICE 2,577,663

INDICATOR

Thomas B. Owens, Barrington, Ill., assignor to Jewel Tea Co., Inc., Chicago, Ill., a corporation of New York Application December 24, 1948, Serial No. 67,119

4 Claims. (Cl. 177—337)

This invention relates to an indicator, and more particularly it has to do with a numeral indicator which may be controlled remotely from any one of a plurality of operator stations for consecutively posting numerals at a conveniently visible location.

While the apparatus of this invention may be used in any situation where it is desirable to inform a number of people of a change of events which may be indicated numerically on an illuminated chart or board, this apparatus has particular use in connection with the meat counter of a modern supermarket. As is well known, it is customary for shoppers in a supermarket to obtain tickets at the meat counter which have numbers thereon indicating the order in which the customers will be served. After obtaining a ticket, each customer must listen for his number to be called.

Due to the fact that each number is called only once and also due to the fact that some people have difficulty in hearing, it is very desirable that the number being served be posted in an elevated position visible from all points of the supermarket so that each customer may conveniently check his own number against the number of the customer being served.

According to the general features of this invention, there is provided a box-like structure having two openings in horizontal alignment in the forward wall thereof. A pair of cylindrical drums are mounted side-by-side in the box for rotation about vertical axes. Numerals from 0 to 9 are imprinted in spaced relation on the exterior wall of each of the cylindrical drums, and the drums are so positioned in the box that only one of the numerals on each drum will register at any time with the opening in the forward wall of the box.

An electric motor is associated with each drum for rotating it, and control apparatus is provided whereby a butcher may index the drum to the next consecutive number when he is ready for the next customer. A novel electric control circuit coordinates the beginning of rotation of the drum, the stopping of the drum, and the ringing of a bell to audibly indicate the change of the numbers.

It is therefore an important object of the present invention to provide an illuminated numerical indicator which may be conveniently mounted above the meat counter of a food store and which may be readily seen from any point in the store.

Another object of the present invention is to provide a numerical indicator that may be indexed remotely from a plurality of stations to show consecutive numbers on the indicator.

A further object of the present invention is to provide a novel electric control circuit for controlling the movement of the numerals in a numeral indicator having rotating drums.

A still further object of the present invention is to provide a novel friction type drive for a rotating drum.

Other and further objects, features and advantages of the present invention will become apparent to one skilled in the art from the following detailed description in the annexed sheets of drawings.

On the drawings:

Figure 4 is a diagrammatic showing of the electrical control circuit of the present invention.

Figure 5 is a fragmentary vertical sectional view, with parts shown in elevation, of a modified form of the indicator of the present invention.

Figure 6 is a vertical sectional view taken on line VI—VI of Figure 5.

Figure 7 is a perspective view of the indicator of Figures 5 and 6.

As shown on the drawings:

Figure 1:
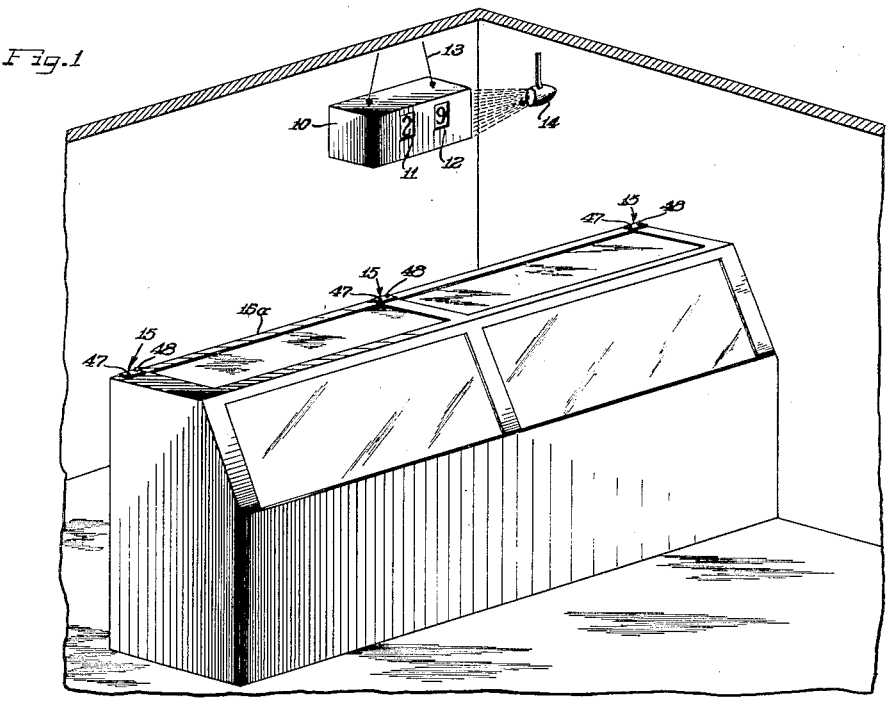
Figure 1 is a fragmentary perspective view illustrating a numeral indicator constructed according to the teachings of the present invention mounted above the meat counter in a food store.

In Figure 1, the reference numeral 10 indicates the casing of a numeral indicator constructed according to the teaching of the present invention having two openings 11 and 12 in the forward wall thereof. The indicator is supported from a convenient support, such as a ceiling (not shown) or any suitable means, as by chains 13. A spotlight 14 may be positioned in front of the indicator so as to focus attention on the indicator without interfering with the line of vision of the customers.

A plurality of control stations 15 are mounted on a display counter 15a from which a butcher may index the indicator to summon the next customer. The control stations 15 are spaced along the counter for the convenience of the butchers. It will be understood, of course, that the control stations 15 may be located at any place adjacent the meat counter as, for example, a wrapping counter located behind the meat counter 15a.

Figure 2:
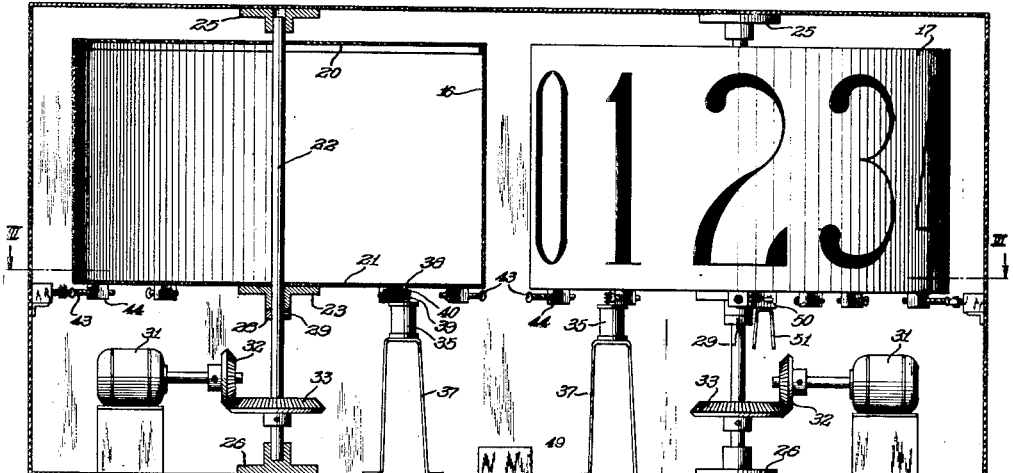
Figure 2 is a vertical sectional view, with parts shown in elevation, taken through the numeral indicator of the present invention.

In Figure 2 the inside of the casing 10 of the indicator is illustrated. As shown therein, a pair of hollow cylindrical drums 16 and 17 are mounted for rotation side-by-side in the casing 10. On the outer cylindrical face of each drum consecutive numerals from 0 to 9 are inscribed thereon equally spaced from one another. The numerals may be painted on the drum with a luminescent paint so that they will show up when the rays from the spotlight 14 are directed thereon. It is evident, of course, that any other suitable method of inscription may be used, such as black paint on a white background.

While the drum 16 carries the tens digits and the drum 17 carries the units digits, they are substantially identical as to construction, and it is believed that a detail description of one drum will serve to adequately disclose this feature of the invention.

Each drum has end wall members 20 and 21 in which a shaft 22 is freely journaled for rotation relative to the drum. The lower or bottom wall 21 carries a flange plate 23 which also provides a journal for the shaft 22. This shaft 22 may conveniently be journaled at its upper end in a bearing member 25 secured to the upper wall of the casing and at its extreme lower end in a thrust bearing 26 secured to the bottom wall of the casing.

The drum is rotated by means of a friction collar 28 which is keyed to the shaft 22, as by a set screw 29, at a point just below the flange plate 23. The collar 28 and the plate 23 have contacting surfaces made of materials that have suitable frictional characteristics when in contact to cause the drum to be rotated when the collar 28 is rotated with the shaft 22. The flange plate 23 may conveniently have a relatively smooth metal contact surface while the surface of the collar 28 may be made of a composite material such as used on brake or clutch facings.

The shaft 22 is driven from an electric motor 31 through bevel gears 32 and 33. While a bevel gear drive is herein illustrated, it will be understood that any suitable type of drive such as a worm gear drive or a belt drive may be utilized in this installation.

The rotating drum is stopped by means of a solenoid 35 that has a plunger 36 and is mounted on a pedestal 37 which is secured to the base of the casing 10. The plunger 36 is aligned to register with a circular ring of spaced holes 38 (Figure 3) in the bottom wall 21 of the drum.

When the solenoid 35 is energized, the plunger 36 is retracted into the housing of the solenoid. Upon deenergization of the solenoid, the plunger is quickly moved out of the housing by a spring 39 which is disposed around the plunger and acts between the housing and a collar 40 on the plunger.

Thus, in operation, the drum is frictionally driven by the shaft 22 through the collar 28, but when shaft 22 is stopped said drum will continue to coast a short distance. As will be explained hereinafter, the solenoid 35 and the holes 38 in the drum are so located that the plunger of the solenoid will not move into a hole 38 to stop the coasting of the drum after the shaft 22 has been stopped until the next numeral is aligned with the aperture. In addition, the solenoid plunger is not released into the path of the holes until the motor is deenergized. Thus, the plunger 36 will not be required to act against the driving force of the friction collar. In fact, after the shaft 22 is stopped the friction collar will have a braking effect on the drum.

Figure 3:
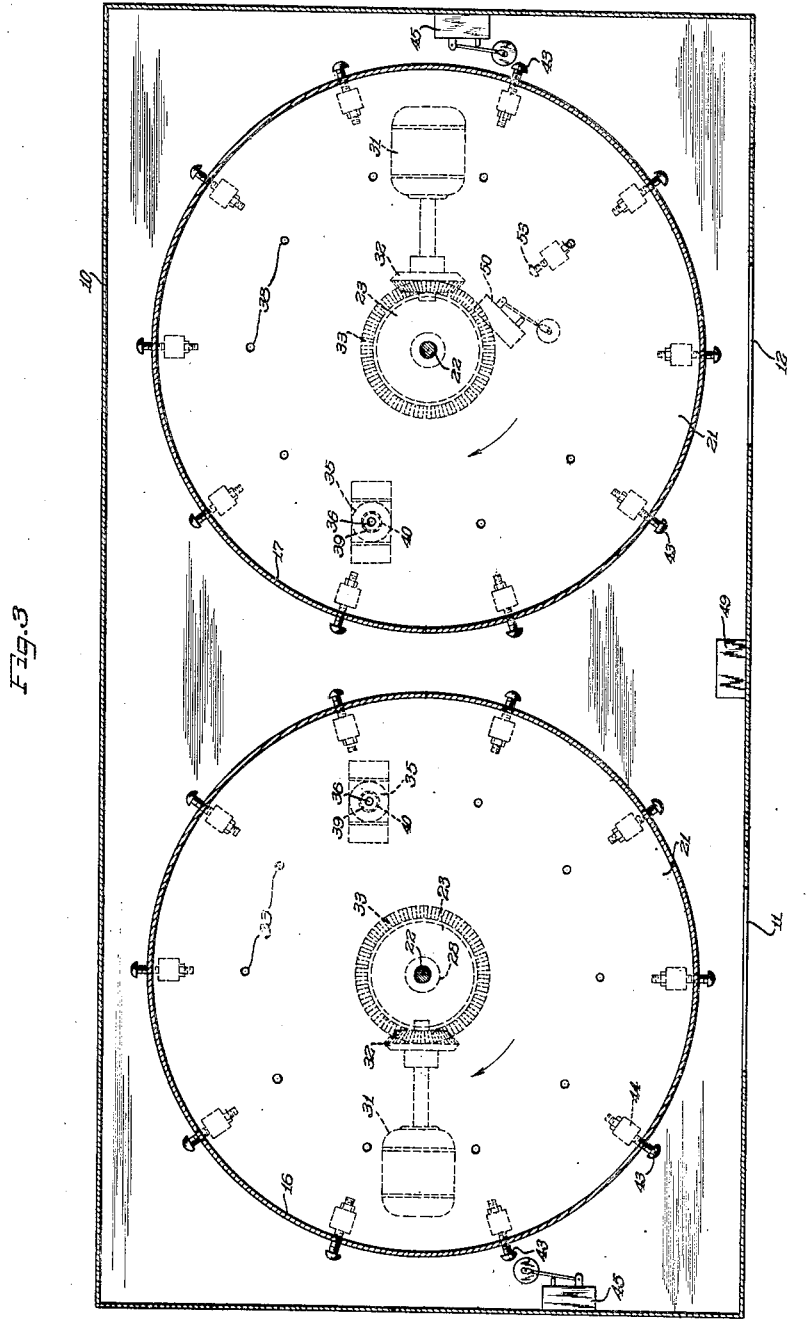
Figure 3 is a horizontal sectional view taken substantially on line III—III of Figure 2.

As seen in Figures 2 and 3, a plurality of contact arms 43, one for each digit, are adjustably mounted in blocks 44 which are secured to the undersurface of the bottom plate 21 of the drum. These arms are spaced equidistantly around the periphery of the drum and are arranged to trip a microswitch 45 that is mounted on the casing 10.

The apparatus of the present invention is put into operation in the following manner. A push button 47 (Figure 1) at one of the control stations 15 is pressed by one of the butchers. This button closes an electric circuit which (1) Starts the electric motor 31, causing the rotation of the unit drum 17, (2) Energizes the solenoid 35 to retract the plunger 36, (3) Energizes a signal light 48 on each control plate 15.

This signal light 48 remains energized while the drum is rotating and is notice to the other butchers that indexing of the indicator is taking place.

After the drum 17 is rotated a predetermined distance, an arm 43 trips the microswitch 45 causing the above-mentioned circuit to be broken, deenergizing the motor 31, the solenoid 35, and the light 48. The spring 40 urges the plunger 36 of the solenoid upwardly into a hole 38 in the drum to stop the drum. It will be recognized that the location of the hole 38 must be coordinated with the location of the arm 43 and with the location of the numerals on the surface of the drum. When properly coordinated, the drum will be stopped when the next consecutive numeral is aligned with the associated aperture in a forward wall of the casing and the solenoid will be deenergized just before a hole 38 approaches the solenoid station.

Tripping of the microswitch 45 energizes a circuit which rings a bell 49 that is conveniently mounted inside the casing 10 (Figure 2). The bell calls the attention of the customer to the change of the numbers in the indicator.

Since the drum 17 carries the units digits, it will be rotated from 0 to 9 before the drum 16, carrying the tens digits, is rotated. This intermittent operation of the drum 16 is effected by means of a microswitch 50 mounted on a pedestal 51 which is secured to the bottom wall of the casing 10. An arm 53 (Figure 3) adjustably secured to the bottom of the drum 17 is arranged to trip the switch 50 as the drum is indexed from the numeral 9 to the numeral 0. When the switch is tripped it closes a circuit which energizes the motor 31' for driving the drum 16 and energizes the solenoid 35' mounted below the drum 16 to retract the plunger 36'.

After the drum 16 rotates a predetermined distance necessary to index one digit, the microswitch 45 will be tripped by an arm 43 to deenergize the motor and the solenoid causing the drum 16 to be stopped.

In Figures 1 and 3 the position of the operating mechanism is shown for the reading "29" of the numeral indicator. It will be noted in Figure 3 that the drums 16 and 17 are mounted for clockwise rotation about the shaft 22 and that in each case the arm 43 has just passed the microswitch 45 with which it is associated for stopping the rotation of the drum. In the case of the drum 17 it will also be noted that the arm 53 which trips the microswitch 50, when the drum 17 is moving from the numeral 9 to the numeral 0, is in position to trip the microswitch on the next rotation of the drum 17.

The electric circuits which control the operation of the indicator of this invention are illustrated diagrammatically in Figure 4. When any one of the push buttons 47 is pressed down, the circuit is closed between a source of electric energy 60 and a magnetic coil 61 through conductor 62, push button switch 47, conductor 63, coil 61 and conductor 70. When the coil 61 is energized, it draws a lever 64 over to it, the lever 64 pivoting at 65. This pivoting action puts the opposite end 64a of the lever 64 up on the top of a lever 66 and closes contact points 67 of a relay which energizes the motor 31 through conductor 62, conductor 71, points 67, conductor 72, motor 31, and conductor 70.

The lever 66 is normally urged in a counterclockwise rotation about point 68 by a spring 69. Thus, as soon as the lever 64 is pivoted by the coil 61, the lever 66 moves under the end 64a and holds the contact 67 closed even though the push button is released and the magnetic coil 61 is deenergized.

Closing of the contacts 67 also energizes a solenoid 35, associated with the drum 17, by way of the conductor 62, the conductor 71, the contacts 67, conductor 72, conductor 73, solenoid 35 and cnductor 70. The light 48 is also energized when the contacts 67 are closed through the conductor 62, the conductor 71, the contacts 67, the conductor 74, the conductor 75, the light filament 48, the conductor 76, and the conductor 70.

When the microswitch associated with the drum 17 and herein indicated by reference numeral 45 is tripped by the arm 43 of the drum, the above-mentioned circuits are broken and as a result the motor 31 is stopped, the solenoid 35 is deenergized, the spring 39 moves the plunger 36 into the hole or aperture 38 in the drum to stop the rotation thereof, and the signal lights 48 are deenergized. As seen in Figure 4, the microswitch 45 is normally opened. When the arm of the microswitch 45 is struck by the arm 43 of the drum, a circuit is closed to the magnetic coil 79 which is mounted on the same base as the coil 61. This circuit is closed by conductor 62, conductor 92, conductor 80, microswitch contact 45, conductor 81, conductor 82, the coil 79, and conductor 70. When the coil 79 is energized the lever 66 is drawn over to the coil permitting the end 64a of the lever 64 to drop, thus opening the contacts 67. When the contacts 67 are open, the motor 31 stops, the solenoid plunger 36 is spring-pressed against the bottom of the drum for engaging the next hole 38, and the lights 48 go out.

Tripping of the microswitch 45 also energizes a coil 83 by way of the conductor 62, the conductor 92, the conductor 93, the conductor 80, the contact of the switch 45, the conductor 81, the conductor 84, the coil 83, the conductor 85, the conductor 86, the conductor 87, and the conductor 70. When the coil 83 is energized, a lever 89 is drawn down to the coil, thus making contact between terminals 90 and 91. Thus a circuit is established through conductor 62, conductor 92, conductor 93, terminals 91, lever 89, terminal 90, conductor 94, the terminals of the bell 49, conductor 95, conductor 86, conductor 87, and conductor 70.

Thus it is seen that in connection with the drum 17 there is one relay which starts the motor, energizes a solenoid and energizes signal lamps, a second relay that deenergizes the circuits which were energized by the first relay, and a third relay energized by the second relay to ring a bell.

When the microswitch 50 which is mounted below the drum 17 and is arranged for tripping by the lever 53 which is secured to the bottom of the drum 17 is tripped by this lever, a coil 90 is energized through the conductor 62, the conductor 92, the conductor 93, the conductor 95, the microswitch 50, conductor 96, the terminals of the coil 90, conductor 97, and conductor 70. The coil 90 acts in exactly the same manner as the coil 61 to close a pair of contacts 98 which energize the electric motor, herein indicated by reference numeral 31', associated with the drum 16. The closing of the contact 98 also energizes the solenoid 35' to retract the plunger 36' from the hole in the drum 16. When the drum has rotated a predetermined distance an arm 43 will trip the microswitch, indicated by the numeral 45', which will energize a coil 99 which is effective to open the contacts 98 similarly to the action of the coil 79 heretofore described and thereby deenergize the motor 31' and the solenoid 35'. When the solenoid 35' is deenergized, the spring-urged plunger will engage the next hole in the bottom of the drum and stop the rotation of the drum. Thus the drum 16 is rotated only when the microswitch 50 is tripped by the lever 53 which is mounted on the drum 17.

In Figures 5 and 6 a second embodiment of the indicator of the present invention is illustrated. This indicator comprises a drum 100 mounted for rotation about a vertical axis inside a casing 101. It will be understood, of course, that while only one drum is illustrated in Figures 5 and 6, the complete indicator assembly has two drums mounted side by side.

A three-legged bracket 102 is secured to the bottom wall of the drum. The bracket 102 has a friction surface 102a in contact with a friction surface 103a of a disc 103 which is mounted for rotation about a vertical axis defined by a pin 105 formed integral with or secured to the disc 103. The pin 105 is journaled at its upper end in a hole 106 centrally disposed in the bracket 102 and at its lower end in a recess 108 in the upper central portion of a standard 110. Legs 112 support the standard 110 on the base of the casing. If desired the legs 112 may be secured, as by screws, to the casing.

As seen in Figure 5, a motor 112 having a drive shaft 113 carries a gear 114 which is in mesh with teeth 115 disposed on the periphery 116 of the disc 103. Thus, when the motor 112 is energized, the disc 103 is rotated. The engagement of the friction surfaces 102a and 103a causes the drum 100 to be rotated.

It will be understood, of course, that the drum 100 operates on a controlled cycle exactly as the drums 17 and 18 of Figure 2. Also it is to be understood that the base of the drum 100 is provided with a plurality of contact arms 118, and a microswitch 119. In this modification the arms 118 are each mounted on one leg of an angle member 120 that is secured to the base of the drum. A hole is provided in the other leg of the angle member 120 for receiving a plunger 122 of a solenoid 123 which is effective to stop the rotation of the drum. With the holes provided in the angle member 120, it is not necessary to drill holes in the base of the drum.

The casing 100 has a cover portion 125 which is pivotally attached thereto on hinges 126. A socket 127 for an electric light bulb 128 is secured to the underside of the cover 125 directly in line with each drum. When the cover is closed, the bulb is disposed inside the drum for illuminating the numeral that is in front of one of the display openings in the forward wall of the casing. A plug 129 is arranged to be inserted into a socket (not shown) inside the casing.

The drum 100 may be painted black with the numerals cut out of the wall of the drum. A white cloth or wire mesh may be secured across the cut out portions. Then, when the light 128 is energized inside the drum the numeral positioned before the display opening in the forward wall of the casing will be illuminated as the white numeral.

Thus, this second embodiment discloses a drum which is mounted for rotation on a novel friction turntable. This modification also provides a novel means for illuminating the numerals of the indicator.

From the foregoing description it will be seen that there is provided in this invention a novel numeral indicating device which may be actuated from a plurality of operator stations by pushing a button. This actuation of the push button sets in motion a series of electrically driven mechanisms and control devices which index the unit drum one digit, stopping the drum when the next consecutive number is perfectly aligned with the opening in the casing of the indicator. This automatic control circuit also provides for the lighting of a signal switch at the control station and the ringing of a bell when the indexing is performed. It will be appreciated that the mechanism of this invention is simple in construction and does not require a skilled operator to accomplish the necessary indexing of the numerals.

It will, of course, be understood that various details of construction may be varied through a wide range without departing from the principles of the present invention, and it is, therefore, not the purpose to limit the patent granted hereon other than necessitated by the scope of the appended claims.

I claim as my invention:

1. An accessory for the serving counter of a store comprising a control push button switch mounted on said counter, a box-like housing mounted in spaced relation above said counter, a rotatable drum in said housing, numerical indicia spaced on the outer surface of said drum, power means connected to said drum for rotating the same, a second switch mounted in said housing adjacent said drum, a plurality of abutment arms on said drum spaced to conform to the spacing of said numerals and movable against said second switch for tripping the switch, and said power means including an electric circuit that is energized by actuation of said push-button switch and deenergized by tripping of said second switch by said abutment arms.

2. A numeral indicator comprising a housing having an aperture in one wall thereof, a shaft disposed substantially vertically in said housing, a cylindrical drum mounted for rotation on said shaft having a peripheral portion adjacent the aperture in said housing, consecutive numerals on the peripheral portion of the drum adapted to register with said aperture in the housing, a bell mounted in said housing, power means connected to said shaft for driving the same, a friction plate on said shaft, a friction surface on said drum in driving and supporting contact with the friction plate on said shaft, brake means positively engaging said drum to prevent rotation thereof, means for simultaneously energizing said power means to rotate said drum and releasing said brake means, and automatic means for deenergizing said power means, applying said brake and ringing said bell after a predetermined amount of rotation of said drum.

3. In combination a serving counter, a push button control unit secured on said serving counter having a signal light thereon, a housing mounted in spaced relation above said counter having an aperture in one wall thereof, a drum mounted for rotation in said housing having numerals on the periphery thereof, power means including an electric motor for rotating said drum to position one of said numerals adjacent the apertured housing, a bell mounted in said housing, said power means including an electric circuit arranged to be energized by said push button for lighting said signal light and starting said electric motor to rotate said drums, and automatic means for deenergizing said circuit upon a predetermined rotation of said drum and energizing a circuit for ringing said bell.

4. In combination a serving counter, a push button control unit on said counter, a box-like housing mounted in spaced relation above said counter, a rotatable drum in said housing, spaced numerical indicia on said drum, power means connected to said drum for rotating the same, a switch mounted in said housing engaging said drum, and a plurality of abutment arms on said drum spaced to conform to the spacing of said numerals movable against said switch for tripping the switch, said power means including an electric circuit that is energized by actuation of said push button unit and deenergized by tripping of said switch by said abutment arms.

THOMAS B. OWENS.

REFERENCES CITED

The following references are of record in the file of this patent:

UNITED STATES PATENTS

| Number | Name | Date |
|---|---|---|
| 549,241 | Hunter | Nov. 5, 1895 |
| 740,380 | Willower | Sept. 29, 1903 |
| 824,890 | Townsend | July 3, 1906 |
| 944,003 | Sohm | Dec. 21, 1909 |
| 1,218,016 | Tarbox | Mar. 6, 1917 |
| 1,220,109 | Heiny | Mar. 20, 1917 |
| 1,223,169 | Henschel | Apr. 17, 1917 |
| 1,654,943 | Nott | Jan. 3, 1928 |
| 1,952,513 | Reynolds | Mar. 27, 1934 |
| 1,959,379 | McFadin | May 22, 1934 |
| 2,074,066 | Wheeler | Mar. 16, 1937 |
| 2,180,908 | Nevinger | Nov. 21, 1939 |
| 2,241,548 | Frischknecht | May 13, 1941 |
| 2,433,608 | Handley | Dec. 30, 1942 |
| 2,455,209 | Anderson | Nov. 30, 1948 |